Jan. 29, 1957 J. ROVIRA MARÍ 2,779,037
CONSTRUCTION OF HONEYCOMBS
Filed Dec. 11, 1952 3 Sheets-Sheet 2
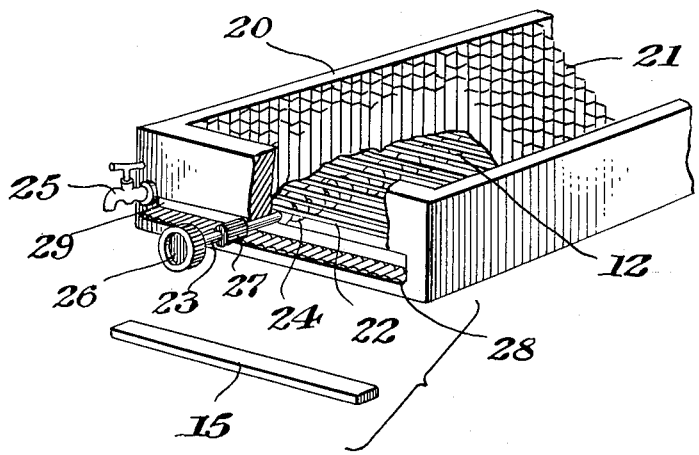
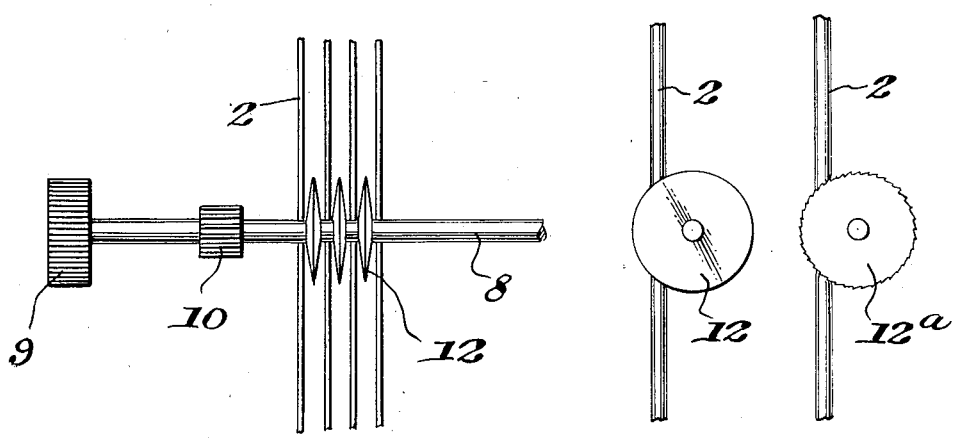
INVENTOR.
Jose Rovira Marí.
BY Wenderoth, Lind and Ponack
ATTYS Jan. 29, 1957
J. ROVIRA MARI
2,779,037
CONSTRUCTION OF HONEYCOMBS
Filed Dec. 11, 1952
3 Sheets-Sheet 3
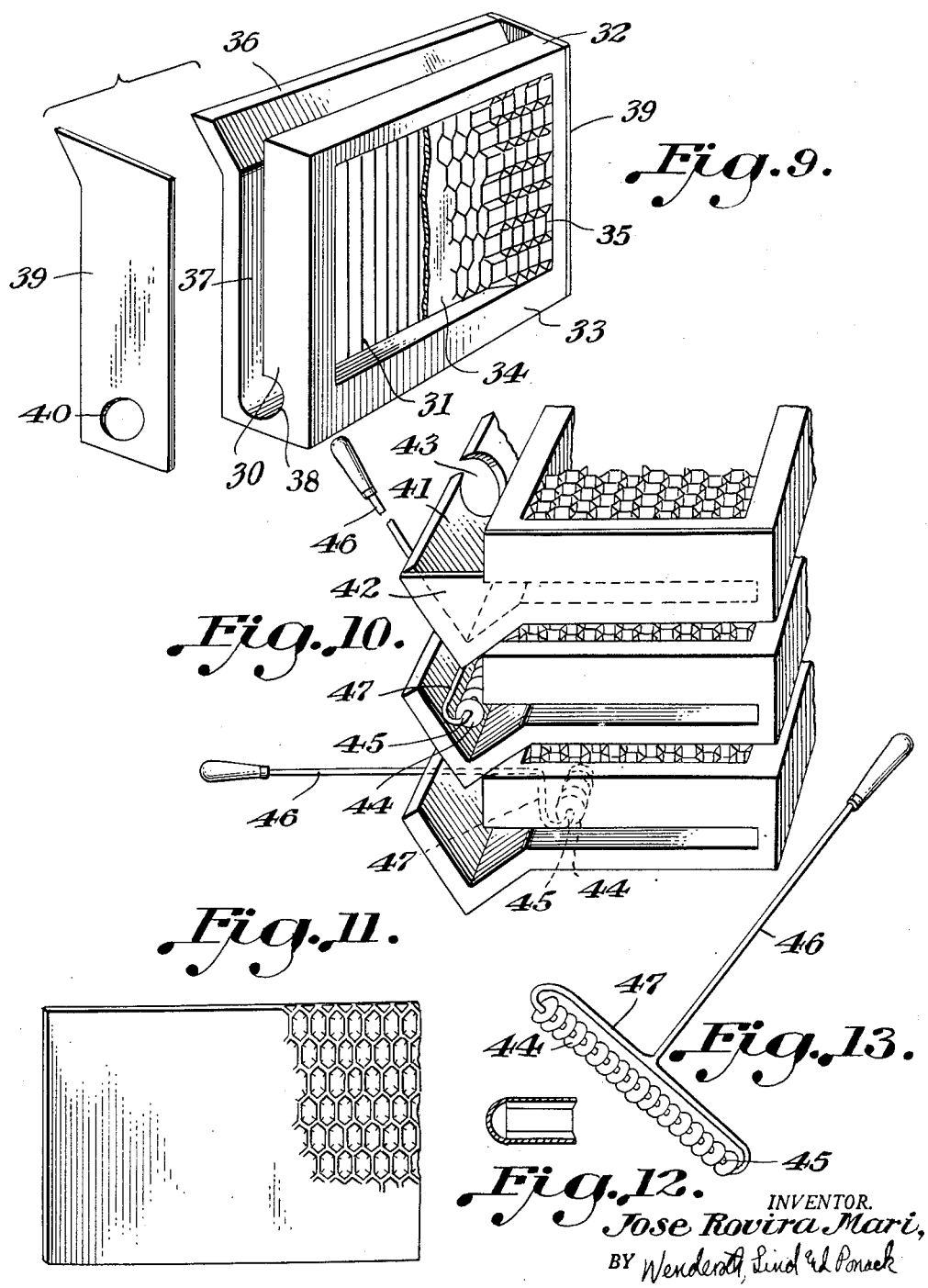
INVENTOR.
Jose Rovira Mari,
BY Wenderoth, Lind & Ponack
ATTYS United States Patent Office 2,779,037
Patented Jan. 29, 1957

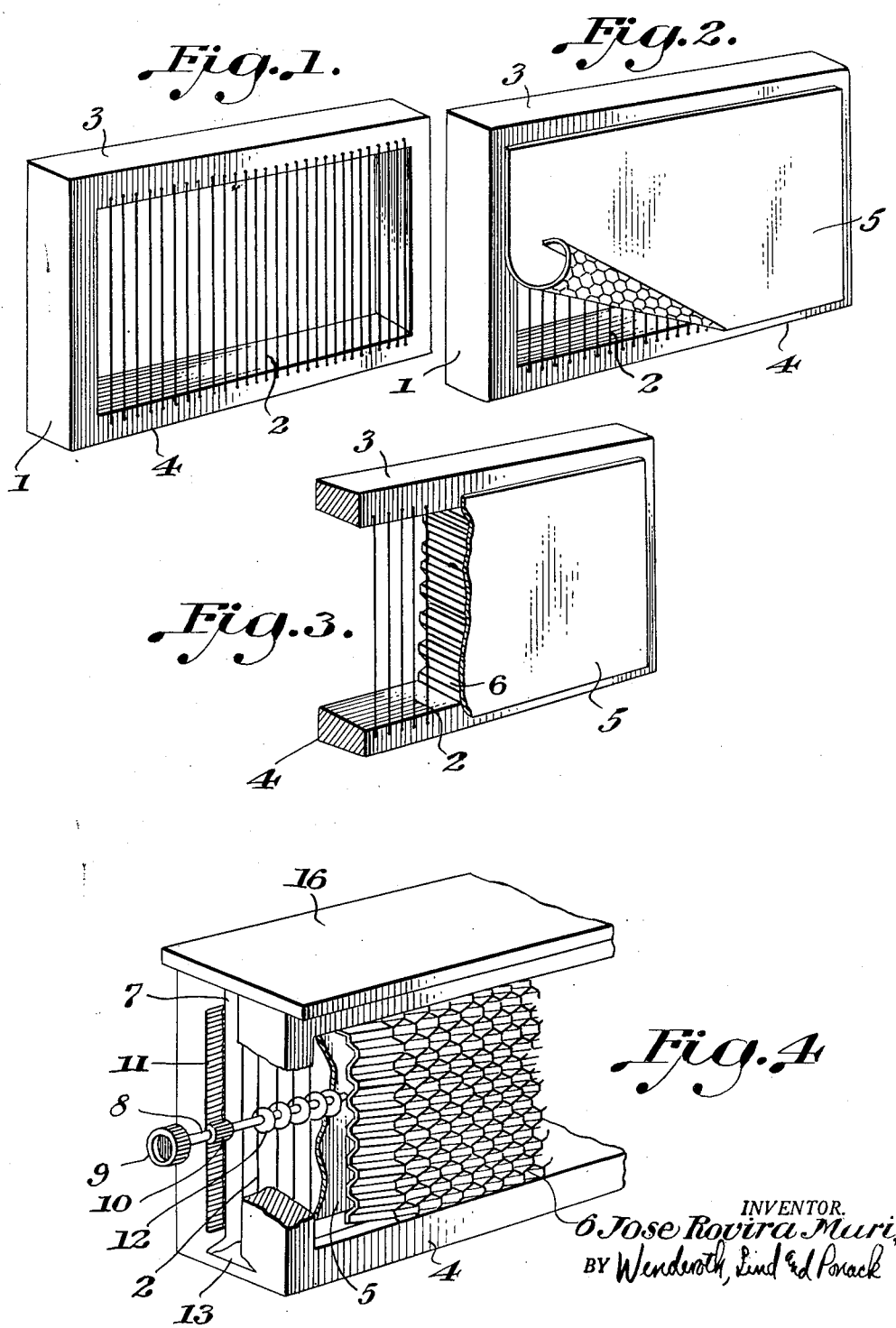

2,779,037
CONSTRUCTION OF HONEYCOMBS

José Rovira Mari, Benifayo, Spain

Application December 11, 1952, Serial No. 325,470

Claims priority, application Spain April 12, 1952

4 Claims. (Cl. 6—11)

The object of the present invention is to provide the apiculturalists with an improved honeycomb having better utility and giving better results than any of the already known types.

Such combs, as used at present, whether natural or artificial, require, in order to permit removal of the honey, the splitting or separation of the cell columns, either in a horizontal direction to separate them from the comb, or in a vertical direction to separate them from the sheet of wax that was placed on one side of the frame as a base for the construction of said comb.

The new structure to be described hereinafter, has many great advantages, as will be appreciated by the description, which arise from the fact that honey can be withdrawn without cutting the cells and disturbing the labor of the bees, so that honey is obtained continuously.

The invention is described with reference to the accompanying drawings, wherein:

Fig. 1 is a perspective view of a frame provided on one side with parallel tapes or threads;

Fig. 2 shows the same frame with a sheet of wax upon which the cells are traced;

Fig. 3 is a perspective view, partly in section of a frame showing the wedge shaped stiles;

Fig. 4 is a perspective view, partly in section, of a single frame having two combs therein which are spaced from each other, the frame being provided with a system of knives to which reference is made hereinafter;

Fig. 5 is a perspective view, partly in section, of a frame placed in a horizontal position;

Fig. 6 illustrates the performance of the knives mounted on a shaft;

Fig. 7 is an elevation view of one shape of the knives;

Fig. 8 is a view of another shape of the knives;

Fig. 9 is a perspective view, partly in section, of a frame with which an independent cutting device may be utilized;

Fig. 10 is a perspective view of several frames in a horizontal position and superposed;

Fig. 11 illustrates the irregular shape of the hexagonal cells, and the sheet of wax;

Fig. 12 is a cross sectional view of a cell, and

Fig. 13 is a perspective view of the independent cutting device usable with the combs represented in Figs. 9 and 10.

By explaining each figure in detail and with the aid thereof, the structure and use thereof will now be described.

Fig. 1 shows a frame wherein a honeycomb is to be formed. This is constituted by a rectangular frame 1, the opening on one side of which is crossed by a series of threads or tapes 2 which are parallel to each other and separated from one another a distance equal to half the width of the alveoles. The stiles 3 and 4 forming this frame are of irregular cross section, one of the edges being longer than and at an angle to the other, the cross section thus being shaped like a wedge, so that the cells formed by the bees are slanted inwardly, the same as in natural hives.

Fig. 2 shows the frame of Fig. 1 provided with a foundation sheet of wax 5 on the inner portion of which has been pressed the shape to be given to the cells or alveoles, and which shape can be of an irregular hexagonal, or any other geometrical shape with a concave, smooth surface at the bottom as seen in Fig. 12. Said sheet of wax covers the threads or tapes, so that when the bees construct their cells, said threads or tapes are held between the sheet and the cells. Thus the bees can only construct their cells within the frame, as the threads or tapes 2 serve to prevent the bees from passing through the frame.

Fig. 3 shows the cells 6 constructed by the bees on the inside portion of the frame 1, the cross section of the wedge shaped stiles 3 and 4 of the wooden frame and the slanted cells constructed thereupon being clearly shown. The threads or tapes 2 and the foundation sheet of wax 5 forming a base for the cells 6.

Fig. 4 shows a frame adapted to have 2 comb sections formed therein, one part of the frame being sectioned. This frame is used with fixed knives. The entrance for the bees to the cells is on from the outside of the frame, that is to say, from the front and rear faces thereof, as shown in the drawing. The frame has positioned therein two spaced wax sheets 5 which are spaced to accommodate a spindle 8 which extends the full length of the frame between the wax sheets and projects through a slot 13 in the side of the frame. The spindle is provided with a knob 9 and for its upward and downward movement a pinion 10 is provided on the spindle and a rack 11 is placed on one side of the slot. The spindle 8 is fitted with a series of circular knives 12, which during rotation each penetrate into a space between two threads or tapes, thereby producing vertical cuts in the sheet of wax 5, and thus permitting the honey that the bees have deposited in the cells or alveoles to drop to the bottom of the space between the two wax sheets and flow out through the bottom of slot 13, where it is collected.

Fig. 5 shows another form of frame provided with fixed circular knives mounted on a spindle, the frame being shown in a horizontal position. This form of frame gives the best results since because of this special arrangement, the honey flows more freely from the cells. The elements constituting this frame are the same as those described in the foregoing figures. The frame 20 is shown with the comb constructed therein so that the openings for the bees open upwardly. These cells 21 rest upon a series of threads or tapes 22 (in this figure they are tapes), which in this case are mounted in a horizontal plane and are covered from beneath by a sheet of wax (not shown). Underneath this sheet is the spindle 23 fitted with the circular knives 24 to cut the wax sheet and open the cells 21 from beneath, and after the bees have deposited their honey it drops through the cuts into the bottom of the frame. Spindle 23 is rotated by a knob 26 on the end thereof which protrudes through slot 29 in the frame 20, and is moved beneath the wax sheet by means of pinion 27 cooperating with rack 28 in the slot 29. The frame fills up to the level of the bottom of the comb, and there is a tap or cock 25, through which the honey is drained off. The slot 29 through which the spindle 23 protrudes, is closed by means of a cover 15.

Fig. 6 is a detail showing the mounting of the knives 12 on the spindle 8 between the threads or tapes 2. The knives are wedge shaped with respect to their radius.

Fig. 7 shows a circular knife 12 which has a smooth cutting edge, and Fig. 8 shows a circular knife 12a having saw teeth, the knives 12 and 12a being interchangeable.

Fig. 9 shows a vertically positioned frame for use with a separate knife device. Within the frame 30 are tapes 31 stretched between stiles 32 and 33 and a sheet of wax 34 is placed over the tapes. The cells 35 of the comb are positioned within the frame between the sheet of wax and one face of the frame. A wall 36 is mounted over the face of the frame opposite the face on which the cells 35 open and between the sheet of wax and the wall is a space. The frame 30 has a vertical slot 37 in one end of the space having a channel 38 in the bottom thereof. The upper end of this wall is bent outwards at an obtuse angle and serves as a guide for the knife device with independent circular knives shown in Fig. 12 when the knife device is used for cutting the alveoles through the sheet of wax 34. The ends of this frame are covered with wooden laths 39 in the lower portions of which are holes 40 aligned with the channel 38, and which, when the channel is not required for the extraction of honey, are closed by lids (not shown).

Fig. 10 illustrates an embodiment in which three complete frames similar to that of Fig. 9, each in a horizontal position, are mounted one on top of the other, and are spaced from each other by means (not shown) to provide an entrance for the bees. An extension 41 is added to the upper end of the rear wall and extends upwards at right angles thereto, and the lath is lengthened as at 42 to cover the added portion of the wall, the lath in the middle and lower frames being removed to show the structural detail. Instead of providing a hole 40 in the lath, a hole 43 is provided in the extension 41 of the wall, which serves as an opening for the insertion of the handle of the knife device (as shown in the drawing), and is also used for the withdrawal of the honey. The frames when placed in this horizontal position are thus provided with a storage canal for the honey which is formed by the extension 41 of the wall, the outlet opening being closed by a cover (not shown).

Fig. 11 shows a sheet of beeswax into which the cross sectional shape of the alveoles is stamped. It will be observed that the vertical sides are longer than the upper and lower slanting sides, thus forming an irregular figure. The bottom of these alveoles is formed by a smooth, concave surface, as is shown in the detail of Fig. 12. These alveoles can also be of any other regular or irregular geometrical figure.

Fig. 13 shows a knife device having a set of independent circular knives 44, that are of the same shape as those shown in Figs. 6 and 7, the knives being mounted on a shaft 45 attached to a handle 46 at the center of a support 47 for the shaft 45.

The described frames afford great advantages in the production of honey, and in this line of industry represent a very important progress. These advantages are:

(1) The cell or alveoles themselves need not be cut and therefore, they are not deteriorated so that the bees are not disturbed in their labor.

(2) Due to their special construction, the collection of honey is continuous.

(3) By the new mechanism, a very small hole is made in the rear of the cells, and through this hole the honey drips into the collecting spaces without hindering the bees from filling in the opposite ends of the cells or alveoles, so that production double that of any of the present day means is achieved.

(4) The honey can be drained directly from the comb, without having to wait until it is ripened, which eliminates the time lost by the bees during the concentration of the honey in the cells.

(5) A very important advantage resides in that by not having to cut the ends of cells in the combs, the eggs deposited by the queen and the bees in the alveoles, are not drained off with the honey, thus damaging the brood and spoiling the honey that would have to be cleaned later. This has been accomplished by constructing the alveoles of the comb in divers geometrical shapes. Thus, for example, they are made generally hexagonal, as this is the normally used design, but with their vertical walls higher or longer than their upper and lower sides. In alveoles made in any other geometrical shape, the queens cannot get accustomed to laying their eggs. However, for safety sake, in all cases, the bottoms of said alveoles are constructed with a smooth and concave surface, thereby achieving that the bees will only deposit honey therein.

(6) Furthermore, these frames are advantageous in that they can be placed either in a vertical or horizontal position.

(7) To afford diverse means of long production for the apiculturalists, two systems of frames are available. One of these is provided with knives mounted on the frame, and the other with independent knives, which may be applied to all types of the novel frames.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What I claim is:

1. In a comb for the production of honey, a rectangular frame suitable for holding hexagonal cells of the comb at an angle such that honey deposited therein will flow towards the closed end of said cells, a series of parallel threads spaced at regular intervals on the length of said frame and stretched across the opening thereof, a sheet of wax affixed to said frame covering said parallel threads and having traced thereon hexagonal figures in a continuous pattern to form the closed end of said cells, a shaft adjacent said sheet of wax having a pinion attached thereto, means consisting of a rack attached to said frame for guiding said shaft along said frame by cooperating with said pinion adjacent to said sheet of wax and in a direction parallel to said threads, circular cutting edges positioned on said shaft in cutting engagement with said wax sheet at intervals such that said wax sheet is cut between said parallel threads, means adjacent to said wax sheet to collect honey, whereby when the cells of the comb are formed by bees and honey deposited therein, said shaft may be moved along said frame and said cutting edges will cut through said wax sheet and the honey will flow through the wax sheet into said collecting means.

2. In a comb for the production of honey a frame suitable for holding cells of the comb in a position such that the honey deposited in said cells will tend to flow toward the closed end thereof, supporting means along the length of said frame and stretched across the opening thereof, a sheet of wax affixed to said frame covering said supporting means and having traced thereon figures in a continuous pattern to form the closed end of said cells, a shaft adjacent said sheet of wax, means attached to said frame for guiding said shaft along said frame adjacent to said sheet of wax in a direction parallel to said supporting means, cutting edges positioned on said shaft in cutting engagement with said wax sheet such that said wax sheet is cut between said supporting means, means adjacent said wax sheet to collect honey, whereby when the cells of the comb are formed by bees and honey deposited therein, said shaft may be moved along said frame and said cutting edges will cut through said wax sheet and the honey will flow out through the wax sheet into said collecting means.

3. In a comb for the production of honey a frame suitable for holding cells of the comb positioned so that honey deposited therein will flow towards the closed end of said cells, a sheet of wax affixed to said frame to form the closed end of said cells, a shaft adjacent said sheet of wax, means for guiding said shaft along said frame adjacent to said sheet of wax, cutting edges positioned on said shaft in cutting engagement with said sheet of wax, means adjacent to said wax sheet to collect honey, whereby when the cells of the comb are formed by bees and honey deposited therein, said shaft may be moved along said frame and said cutting edges will cut through said wax sheet and the honey will flow through the wax sheet into said collecting means.

4. In a comb for the production of honey a pair of frames adjacent each other having a space therebetween, said frames being formed so that cells constructed therein by bees will be positioned so that the closed ends thereof will be adjacent the space between said frames and so said honey deposited in said cells will tend to flow towards the closed ends thereof, supporting means over the openings of said frames adjacent the space between them, sheets of wax affixed to said frames over the openings adjacent the spaces between them and covering said supporting means, a shaft adjacent said sheets of wax and between said frames, means for guiding said shaft between said frames adjacent to said sheets of wax, cutting edges positioned on said shaft in cutting engagement with said sheets of wax at intervals such that said sheets of wax may be cut between said supporting means, means adjacent to said wax sheets to collect honey, whereby when the cells are formed by the bees and honey deposited therein, said shaft may be moved between said frames and said cutting edges will cut through said wax sheets and the honey will flow through said wax sheets into said collecting means.

References Cited in the file of this patent

UNITED STATES PATENTS

| | | |
|---|---|---|
| 127,187 | Peabody | May 28, 1872 |
| 481,578 | Mason et al. | Aug. 30, 1892 |
| 900,643 | Avant | Oct. 6, 1908 |
| 1,188,386 | Babcock | June 27, 1916 |
| 1,407,244 | Babcock | Feb. 21, 1922 |
| 2,108,754 | Ludke | Feb. 15, 1938 |
| 2,223,561 | Garriga | Dec. 3, 1940 |
| 2,631,307 | Sugano | Mar. 17, 1953 |

FOREIGN PATENTS

| | | |
|---|---|---|
| 176,393 | Austria | Oct. 10, 1953 |